United States Patent
Vitale et al.

(10) Patent No.: US 7,033,970 B2
(45) Date of Patent: Apr. 25, 2006

(54) PROCESS FOR PREPARING A DIETHER-BASED CATALYST COMPONENT

(75) Inventors: Gianni Vitale, Ferrara (IT); Massimo Cimarelli, Ferrara (IT); Giampiero Morini, Padua (IT); Leo Cabrini, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 10/486,060

(22) PCT Filed: Feb. 28, 2003

(86) PCT No.: PCT/EP03/02148

§ 371 (c)(1),
(2), (4) Date: Feb. 5, 2004

(87) PCT Pub. No.: WO03/076480

PCT Pub. Date: Sep. 18, 2003

(65) Prior Publication Data

US 2004/0235643 A1    Nov. 25, 2004

(30) Foreign Application Priority Data

Mar. 8, 2002    (EP) .................................. 02075972

(51) Int. Cl.
- B01J 31/00    (2006.01)
- B01J 37/00    (2006.01)
- C08F 4/60    (2006.01)
- C08F 4/02    (2006.01)

(52) U.S. Cl. ..................... 502/126; 502/102; 502/103; 502/115; 526/123

(58) Field of Classification Search ................ 502/126, 502/102, 103, 115; 526/123
See application file for complete search history.

(56) References Cited

U.S. PATENT DOCUMENTS

| | | | |
|---|---|---|---|
| 4,376,062 A | 3/1983 | Hamer et al. | 252/429 B |
| 4,399,054 A | 8/1983 | Ferraris et al. | 252/429 B |
| 4,469,648 A | 9/1984 | Ferraris et al. | 264/9 |
| 5,723,400 A * | 3/1998 | Morini et al. | 502/126 |
| 6,281,306 B1 | 8/2001 | Oskam et al. | 526/161 |
| 6,395,670 B1 * | 5/2002 | Morini et al. | 502/104 |
| 6,468,938 B1 * | 10/2002 | Govoni et al. | 502/126 |
| 6,797,794 B1 * | 9/2004 | Zambon et al. | 526/351 |
| 6,799,568 B1 * | 10/2004 | Zakharov et al. | 526/128 |
| 6,803,428 B1 * | 10/2004 | Saudemont et al. | 526/124.3 |

FOREIGN PATENT DOCUMENTS

| | | |
|---|---|---|
| EP | 0106141 | 4/1984 |
| EP | 0361494 | 4/1990 |
| EP | 0622380 | 11/1994 |
| EP | 0728724 | 8/1996 |
| EP | 0728769 | 8/1996 |
| KR | 8302661 | 12/1983 |
| WO | WO 00/08065 A2 * | 2/2000 |
| WO | WO 00/63261 A1 * | 10/2000 |
| WO | 0212357 | 2/2002 |
| WO | 02100904 | 12/2002 |

OTHER PUBLICATIONS

Database EPODOC Online!, European Patent Office, The Hague, Netherlands; XP002247097.

* cited by examiner

*Primary Examiner*—J. A. Lorengo
*Assistant Examiner*—Jennine Brown
(74) *Attorney, Agent, or Firm*—Jarrod N. Raphael; William R. Reid

(57) ABSTRACT

A process for preparing a diether-based catalyst component in which: a) a slurry is obtained by contacting a solid support comprising a magnesium halide or a precursor thereof, one or more 1,3-diethers and a liquid phase containing a titanium compound, and b) the obtained slurry is then subjected to a solid/liquid separation step in order to isolate a diether-based catalyst component; said separation step b) being characterized in that the ratio between the solid/liquid separation velocity and the final amount of separated solid must be higher than 0.5 liter/(min·Kg).

20 Claims, No Drawings

PROCESS FOR PREPARING A DIETHER-BASED CATALYST COMPONENT

This application is the U.S. national phase of International Application PCT/EP03/02148, filed Feb. 28, 2003.

The present invention relates to the preparation of solid catalyst components, which can be advantageously used in the preparation of supported catalysts for the polymerization of olefins.

In particular, the present invention relates to a process for preparing a diether-based catalyst component useful in the preparation of supported catalysts of the Ziegler-Natta type.

BACKGROUND OF THE INVENTION

It is known in the art that high yield catalytic components of Ziegler-Natta type may be obtained by contacting a titanium compound comprising at least a titanium-halogen bond with a solid support comprising a magnesium halide. Solid catalytic components of the Ziegler-Natta type are obtained, for instance, by reacting $TiCl_4$ with a support containing a magnesium compound that can be a magnesium dihalide, such as $MgCl_2$, or an alcoholate or haloalcoholates of magnesium, such as ethoxymagnesiumchloride or diethoxymagnesium. A particular type of support consists of adducts of $MgCl_2$ with aliphatic alcohols, such as ethanol, in the form of spherical particles. It is known that in order to obtain a more effective catalyst component, the titanation of the particles of the solid support should be carried out at a high temperature, generally above 80° C., and preferably in the range 90–130° C. When a supported catalyst is produced for the polymerisation of propylene or higher $\alpha$-olefins, it is necessary the presence of an internal electron donor compound in the solid catalytic component. In fact, the presence of said electron-donating compound (Di) allows the preparation of supported catalysts endowed not only with a high catalytic activity, but also with a high stereospecifity.

Electron donor compounds suitable for the preparation of solid catalyst components can be selected from esters, ketones, amides and amines. A particular class of suitable internal electron donors is represented by mono- and di-alkyl esters of aromatic carboxylic acids, such as diisobutylphtalate or ethylbenzoate. Besides these compounds, also specific ethers have been proved to be effective as internal donors. EP 361 494 discloses solid catalyst components comprising, as an internal electron-donor, an ether containing two or more ether groups, preferably in 1,3 position, and having specific reaction characteristics towards the anhydrous magnesium chloride and $TiCl_4$. In particular, this ether is capable of forming complexes with activated anhydrous magnesium dichloride in a quantity of less than 60 mmoles per 100 g of $MgCl_2$ and it enters into substitution reactions with $TiCl_4$ for less than 50% by moles. The presence of the above 1,3-diethers in the solid catalytic component causes a remarkable increase of the catalytic activity of the final catalyst, with respect to the case of a conventional electron donor selected from phtalates or ethylbenzoate. Moreover, the catalysts obtained from the reaction of said catalyst component with an Al-alkyl compound exhibit high stereospecifity in the polymerization of olefins, even in the absence of an external electron donor (De). In fact, according to EP 361 494 the use of the above diethers allows to achieve good results in term of activity and stereospecifity even without including an external electron donor compound in the catalyst system.

Another advantage correlated to the presence of a 1,3-diether in the solid catalyst component consists of providing an improved control of the final molecular weight of the obtained polymer, which makes it possible to produce polymers with very high melt flow rates, as those disclosed in EP 622 380. The presence of a 1,3-diether in the solid catalytic component makes more effective use of hydrogen introduced during the polymerization for the regulation of the length of polymeric chains. As a consequence, the use of a 1,3-diether as an electron donor not only makes more flexible the polymerization process itself, but also allows to widen the range of products having a different molecular weight.

EP 728 769 refers to electron donors selected from 1,3-diethers, in which the carbon atom in position 2 belongs to a specific cyclic structure containing at least two unsaturations (cyclopolyenic structure). Said cyclopolyenic 1,3-diethers confer a further increase of the catalyst activity with respect to the ethers heretofore known. Furthermore, the cyclopolyenic 1,3-diethers can be successfully used both as internal and external electron donor compounds.

In view of the above advantages, it is of great technical interest to develop an industrial process for the preparation of a solid catalytic component containing a 1,3-diether as electron donor compound.

According to EP 728 769 a solid catalyst component is obtained by reacting a $MgCl_2.nROH$ adduct in the form of spheroidal particles, where n is 1–3 and ROH is preferably an aliphatic alcohol, with an excess of $TiCl_4$ containing a cyclopolyenic 1,3-diether as electron donor. The temperature is initially in the range from 0 to 25° C., and then is increased to 80–135° C. After a time ranging from 30 minutes to 2 hours the reaction product comprising the titanated solid support is separated from the liquid phase. After the separation of the liquid phase, one or more further steps of titanation can be carried out under conditions similar to those described above. After the last reaction with $TiCl_4$, the obtained solid is separated, for example by way of filtration, and washed with a hydrocarbon solvent until no chlorine ions can be detected in the washing liquid. The experiments are carried out in a laboratory reactor, specifically in a 500 ml glass reactor equipped with a filtering barrier. Although the description of the examples is detailed in some aspects, it must be noted that the cited document fails to recognise any criticality in the step of slurry separation. In fact, the conditions under which the separation of the slurry is carried out (time, temperature, stirring) are not reported.

Conversely, the Applicant has found that during the preparation of solid catalyst components containing 1,3-diethers, the control of the parameters of the separation step can have a relevant impact on the properties of the final catalyst. This problem is particularly apparent in the large-scale production, where in view of the large volumes of reactants involved, any failure to control the parameters of the separation step can cause a remarkable worsening of the catalytic properties of entire lots of catalyst components.

The Applicant has now found that in order to prepare solid catalyst components containing 1,3-diethers with high activity and stereospecifity, it is important to select properly the operative conditions both in the titanation step and in the successive separation step of the slurry.

It is therefore an object of the present invention a process for preparing a diether-based catalyst component in which:

a) a slurry is obtained by contacting a solid support comprising a magnesium halide or a precursor thereof, one or more 1,3-diethers and a liquid phase containing a titanium compound, and b) the obtained slurry is then subjected to a solid/liquid separation step in order to isolate a diether-based catalyst component;

said separation step b) being characterized in that the ratio between the solid/liquid separation velocity and the final amount of separated solid must be higher than 0.5 liter/(min·Kg), preferably comprised in the range from 0,7 to 2 liter/(min·Kg). As solid/liquid separation velocity is intended the volume of liquid separated from the solid catalyst component in the unit of time (liter/min).

The amount of separated solid is intended as the amount of di-ether based catalyst component obtained at the end of step b) and expressed in kg.

The solid/liquid separation step may be carried out according to different separation techniques, such as filtration or centrifugation, preferably by filtration. In this case, the filters are vessels containing one or more filtering units, the openings thereof are comprised between 1 to 200 µm. The differential pressure applied on the filter can range from 50 to 1000 Kpa: in any case, it will be suitably selected in order to get the above mentioned solid/liquid separation velocity. As examples of filters, Nutsche filters (for example the Rosenmund type) can be mentioned: they consist of a tank with a perforated or porous bottom, which may either support a filter medium or act as the filter medium. The filter medium can be a filter cloth, a sintered plate, a porous ceramic structure, a wire screen, or a perforated plate. Also centrifugal-discharge filters, such as a Funda filter, can be used: they consist of a vessel that coassially contains an assembly of horizontal filter plates mounted on a hollow motor-connected shaft. After a suitable filtration time, the rotation of the shaft allows a discharge of the solid deposited onto the filter plates.

In the present invention step a) takes usually place in a reactor situated upstream of the filter. However, both step a) and step b) can also take place in the filter itself.

If step b) is carried out by centrifugation, a rotating drum can be used to separate the slurry. The rotation velocity of the drum must be sufficient to concentrate the solid component as a layer on the walls of the drum, while the liquid can be withdrawn from the central portion of the drum.

In step a) the initial temperature of the liquid phase containing the Ti compound can be in the range from −20° C. to 25° C. Such a temperature is then gradually raised to a value to be kept in the range from 80° C. to 135° C. in order to ensure an effective titanation of the support particles.

A typical scheme for preparing a di-ether based catalyst component according to the present invention is given below.

A vessel provided with stirring means is fed, at a temperature in the range from −20° C. to 25° C., with a liquid phase containing the Ti compound, a 1,3-diether compound and a solid support comprising a Mg halide in the form of spheroidal particles: the molar ratio Mg/1,3-diether is such to be comprised between 0.5 and 50, preferably between 2 and 20;

the temperature of the vessel is then gradually raised to a value comprised between 80° C. and 135° C.; after a residence time comprised between 15 minutes and 3 hours, the obtained slurry is subjected to a solid/liquid separation according to the conditions set in step b);

the above steps a) and b) can be repeated more times in sequence and finally the separated solid component is washed with a suitable solvent until no chlorine ions can be detected in the washing liquid. The solvent can be a hydrocarbon, such as toluene, pentane, hexane or a halogenated hydrocarbon, such as chloroform.

The process of the invention is of great industrial interest, since the operative conditions selected in steps a) and b) allow the preparation on industrial scale of a diether-based catalyst component able to give a final catalyst characterized by a high level of activity and stereospecifity. Tests carried out by the Applicant and illustrated by the comparative examples below reported, show that when in step b) the ratio between the solid/liquid separation velocity and the final amount of separated solid is less than 0.5 liter/(min·Kg), the worsening of catalyst properties of the final catalyst becomes unacceptable.

The titanium compound to be fed in step a) may be selected from $TiCl_4$, $TiCl_3$ and Ti-haloalcoholates of formula $Ti(OR)_{n-y}X_y$, where n is the valence of titanium, y is a number between 1 and n−1 X is halogen and R is a hydrocarbon radical having from 1 to 10 carbon atoms. The preferred titanium compound is $TiCl_4$.

The solid support to be fed to the vessel in step a) may be a magnesium halide, such as $MgCl_2$, or a Mg compound capable to yield $MgCl_2$ by reaction with a chlorinating agent such as $TiCl_4$.

Particularly preferred supports are adducts of a magnesium halide with an aliphatic alcohol, preferably ethanol. It is preferred that the magnesium halide is in its active form or that the magnesium compound is capable to yield a magnesium halide in its active form when reacted with a chlorinating agent. As it is well known in the field of Ziegler-Natta catalysts, "magnesium chloride in active form" means magnesium chloride characterized by X-ray spectra in which the most intense diffraction line that appears in the spectrum of the non-active halide is diminished in intensity and is replaced by a halo whose maximum intensity is displaced towards lower angles relative to that of the more intense line.

Preferred supports are spheriform adducts of formula $MgCl_2 \cdot pROH$, where p is a number between 0,1 and 6 and R is a hydrocarbon radical having 1–18 carbon atoms. Said adducts can be suitably prepared in spherical form by mixing alcohol and magnesium chloride in the presence of an inert hydrocarbon immiscible with the adduct, operating under stirring conditions at the melting temperature of the adduct. Then, the emulsion is quickly quenched, thereby causing the solidification of the adduct in form of spherical particles. Examples of spherical adducts prepared according to this procedure are described in U.S. Pat. No. 4,399,054, U.S. Pat. No. 4,469,648. The so obtained adduct can be optionally subjected to thermal controlled dealcoholation (80–130° C.) so as to obtain an adduct in which the number of moles of alcohol is generally lower than 3 preferably between 0.1 and 2.5. Particularly preferred supports are $MgCl_2$/ethanol adducts with an average diameter in the range from 0.1 to 150 µm, more preferably from 1 to 100 µm.

In a particular embodiment of the present invention, the liquid phase fed to the vessel contains a liquid organic substance having dielectric constant at 20° C. equal to or higher then 2 such as those described in EP-106,141. Preferred liquid organic substances are aromatic hydrocarbons or aromatic halohydrocarbons. The use of aromatic halohydrocarbons, such as chlorinated aromatic hydrocarbons, may lead to superior activities. In the class of non-halogenated hydrocarbons, toluene and ethylbenzene are particularly preferred.

The 1,3-diethers to be fed in step a) show specific reaction characteristics towards the anhydrous magnesium chloride and TiCl$_4$. In particular, these ethers are capable of forming complexes with activated anhydrous magnesium dichloride in a quantity of less than 60 mmoles per 100 g of MgCl$_2$ and enter into substitution reactions with TiCl$_4$ for less than 50% by moles. They have formula (I):

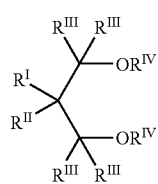

(I)

where $R^I$ and $R^{II}$ are hydrogen or linear or branched $C_1$–$C_{18}$ hydrocarbon groups which can also form one or more cyclic structures, with the proviso that $R^I$ and $R^{II}$ cannot be contemporaneously hydrogen; $R^{III}$ groups, equal or different from each other, are hydrogen or $C_1$–$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1–6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl;

when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl;

$R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl- 2-benzyl-1,3-dimetoxypropane, 2-cyclohexyl-2-cyclohexylmethyl-1,3-dimethoxypropane.

Specially preferred are the compounds of formula (II):

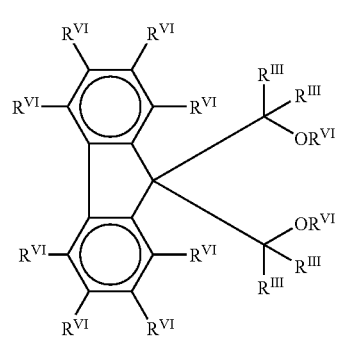

(II)

where the $R^{VI}$ radicals equal or different are hydrogen; halogens, preferably Cl and F; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (I).

Specific examples of compounds comprised in formula (II) are:
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.
9,9-bis(methoxymethyl)fluorene being the most preferred.

The catalyst systems comprising the solid catalyst components obtained with the process of the present invention are particularly suitable to homo- or co-polymerise α-olefins of formula $CH_2$=CHR, wherein R is hydrogen or an alkyl, cycloalkyl, aryl, arylalkyl or alkylaryl radical with 1 to 12 carbon atoms. A preferred field of application is the stereospecific polymerisation of propylene for the preparation of homopolymer or copolymers thereof.

The diether-based catalyst components described above are generally used after contacting them with an aluminium compound such as an aluminium-trialkyl or an aluminium-alkyl-hydride. A commonly used aluminium compound is triethyl-aluminium.

Particularly when isotactic polymers are produced, an external electron donor can be contacted with the di-ether based catalyst component of the invention. Suitable external electron donor compounds include silicon compounds, ethers, esters, amines, heterocyclic compounds. Preferred compounds used as external donors are silicon compounds containing at least one Si—OR bond (R being a hydrocarbon radical). Among them, particularly preferred are the silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a $C_1$–$C_{10}$ alkyl group, in particular methyl. Examples of such preferred silicon compounds are methylcyclohexyldimethoxysilane, diisopropyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperi-dinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The external electron donor compound (c) is used in such an amount to give a molar ratio between the organoaluminum compound and said electron donor compound (c) of from 0.1 to 500, preferably from 1 to 300 and more preferably from 3 to 100. As previously indicated, when used in the (co)polymerization of olefins, and in particular of propylene, the catalysts of the invention allow to obtain, with high yields, polymers having a high isotactic index (expressed by high xylene insolubility X.I.), thus showing an excellent balance of properties.

Therefore, it is a further object of the present invention a process for the homo- or copolymerization of olefins $CH_2$=CHR, in which R is hydrogen or a hydrocarbyl radical with 1–12 carbon atoms, carried out in the presence of a catalyst as described above.

Said polymerization process can be carried out according to known techniques for example slurry polymerization using as diluent an inert hydrocarbon solvent, or bulk polymerization using the liquid monomer (for example propylene) as a reaction medium. Moreover, it is possible carrying out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Hydrogen or other compounds capable to act as chain transfer agents can be used to control the molecular weight of polymer.

The following examples will further illustrate the present invention without limiting its scope.

EXAMPLES

In the following examples a solid support consisting of a $MgCl_2 \cdot 2.8C_2H_5OH$ adduct was prepared according to the method described in example 2 of U.S. Pat. No. 4,399,054 but operating at 3,000 rpm instead of 10,000.

9,9-bis(methoxymethyl)fluorene is used as internal donor (Di) and is prepared as described in EP 728 769.

Determination of the Isotactic Index (X.I)

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference the xylene insoluble fraction (%).

The melt flow index (MFR/L) of the polymer is measured according to ASTM D-1238 condition "L".

Example 1

Preparation of the Solid Catalytic Component 108 liters of $TiCl_4$ are introduced at 0° C. in a 120 liters stainless steel reactor equipped with a stirring device and baffles. Under stirring 5.4 Kg of a support of formula $MgCl_2 \cdot 2.8C_2H_5OH$, are introduced.

At the end of the addition, the temperature is risen to 40° C. and 4.07 moles of 9,9-bis(methoxymethyl)fluorene are introduced as 1,3-diether.

The temperature of the reaction mixture is then increased to 100° C. and stirring is maintained for 50 minutes.

The obtained slurry is then transferred to a Rosenmund filter having openings of 5 μm and then filtered: the filtration time is 29 minutes and 97 liters of $TiCl_4$ are removed.

The filtration is carried out by operating at a differential pressure of 207 Kpa.

The separated solid is then subjected to a successive step of titanation by adding 100 liters of fresh $TiCl_4$: after 10 minutes under stirring at 100° C. the slurry is filtered again, thus removing 100 liters of $TiCl_4$ in a filtration time of 19 minutes.

After the above filtration, another treatment with 100 liters of $TiCl_4$ is carried out at 100° C.: after 10 minutes under stirring the slurry is filtered again, thus removing 100 liters of $TiCl_4$ in a filtration time of 17 minutes.

Finally the separated solid is washed at 80° C. with hexane and filtered until all chlorine ions disappear from the filtrate. The solid is dried and 4.3 Kg of catalyst component are obtained.

In the above separation steps the operative conditions are such that the ratio between the solid/liquid separation velocity and the final amount of separated solid is higher than 0.5 liter/(min·Kg). For instance, in the first separation step the value of the above ratio is 97/(29×4.3)=0.77 liter/(min·Kg)

The obtained catalyst component contains:
Ti=4.1% by wt;
9,9-bis(methoxymethyl)fluorene=16.9% by wt Polymerization Test The polymerization is carried out in a 4 liter autoclave, previously purged with gaseous propylene at 70° C. for 1 hour.

70 ml of anhydrous n-hexane containing 7 mmol of triethylaluminum and 4 mg of the above prepared solid catalyst component are introduced in a propylene flow at room temperature.

1.7 Nl of H2 and 1.2 Kg of liquid propylene are then introduced in the autoclave: the stirring device is actuated and the temperature is increased to 70° C. in 5 minutes.

After 2 hours at 70° C., the agitation is stopped, the non-polymerized monomer is vented and the reactor content is cooled to room temperature.

452 g of polypropylene are discharged from the autoclave, said polypropylene having a isotacticity index (X.I.)=96%, measured as fraction insoluble in xylene at 25° C., and a melt flow index MFR/L=5.8 g/10 min.

The polymerization yield is 113 Kg of polypropylene/g of solid catalyst component.

Example 2

108 liters of $TiCl_4$ are introduced at 0° C. in a 120 liter stainless steel reactor equipped with a stirring device and baffles. Under stirring 5.4 Kg of a support of formula $MgCl_2.2.8C_2H_5OH$, are introduced.

At the end of the addition, the temperature is risen to 40° C. and 4.07 moles of 9,9-bis(methoxymethyl)fluorene are introduced.

The temperature of the reaction mixture is then increased to 100° C. and stirring is maintained for 50 minutes.

The obtained slurry is then transferred to a Funda filter comprising 10 filter plates with openings of 10 μm: 97 liters of $TiCl_4$ are removed in a filtration time of 30 minutes. The filtration is carried out by operating at a differential pressure of 150 Kpa.

Successively 213 l of $TiCl_4$, pre-heated at 100° C., are continuously fed to the Funda filter and simultaneously filtered in 35 minutes. Also in this case the operative conditions are such that the ratio between the solid/liquid separation velocity and the final amount of separated solid is higher than 0.5 liter/(min·Kg).

Finally the separated solid is washed at 80° C. with hexane and filtered until all chlorine ions disappear from the filtrate.

The obtained catalyst component contains:
Ti=4.8% by wt;
9,9-bis(methoxymethyl)fluorene=12.9% by wt Polymerization Test 70 ml of anhydrous n-hexane containing 7 mmol of triethylaluminum and 3.5 mg of the above prepared catalyst component are introduced in a propylene current at room temperature in the same autoclave of Example 1.

1.7 Nl of H2 and 1.2 Kg of liquid propylene are then introduced in the autoclave: the stirring device is actuated and the temperature is increased to 70° C. for a time of 5 minutes. After 2 hours at 70° C., the agitation is interrupted, the non-polymerized monomer is removed and the reactor content is cooled to ambient temperature.

455 g of polypropylene are discharged from the autoclave, said polypropylene having a X.I.=95% and a melt flow index MFR/L=5.0 g/10 min.

The polymerization yield is 130 Kg of polypropylene/g of solid catalyst component.

Example 3

The polymerization test of example 2 is carried out with the difference that 70 ml of anhydrous n-hexane introduced in the polymerization autoclave contain: 7 mmol of triethylaluminum, 4.3 mg of a solid catalyst component prepared as described in Example 2, and 0.35 mmol of dicyclopentyldimethoxysilane as an external donor (De).

452 g of polypropylene having a X.I.=99% and a melt flow index MFR/L=4.5 g/10 min are obtained. The polymer yield is 105 Kg of polypropylene/g of solid catalyst component.

Example 4

108 liters of $TiCl_4$ are introduced at 0° C. in a Rosenmund Filter having a volume of 120 liters and openings of 5 μm.

Under stirring 5.4 Kg of a support of formula $MgCl_2.2.8C_2H_5OH$, are introduced inside the filter.

At the end of the feeding, the temperature is risen to 40° C. and 4.07 moles of 9,9-bis(methoxymethyl)fluorene are introduced.

The temperature of the reaction mixture is then increased to 100° C. and stirring is maintained for 50 minutes.

After this time, the obtained slurry is filtered and 97 liters of $TiCl_4$ are removed in a filtration time of 29 minutes with a differential pressure of 207 Kpa.

The separated solid is then subjected to a successive step of titanation by adding 100 liters of fresh $TiCl_4$: after 10 minutes under stirring at 100° C. the slurry is filtered again, thus removing 100 liters of $TiCl_4$ in a filtration time of 17 minutes. Also in this case the operative conditions are such that the ratio between the solid/liquid separation velocity and the final amount of separated solid is higher than 0.5 liter/(min·Kg).

Finally the separated solid is washed at 80° C. with hexane and filtered until all chlorine ions disappear from the filtrate. The solid is then dried so obtaining 4.2 Kg of catalyst component.

The obtained catalyst component contains:
Ti=4.5% by wt;
9,9-bis(methoxymethyl)fluorene=16.5% by wt Polymerization Test The polymerization is carried out in a 4 liter autoclave, previously purged with gaseous propylene at 70° C. for 1 hour.

70 ml of anhydrous n-hexane containing 7 mmol of triethylaluminum and 4.8 mg of the above prepared solid catalyst component are introduced in a propylene current at room temperature.

1.7 Nl of H2 and 1.2 Kg of liquid propylene are then introduced in the autoclave: the stirring device is actuated and the temperature is increased to 70° C. for a time of 5 minutes. After 2 hours at 70° C., the agitation is interrupted, the non-polymerized monomer is removed and the reactor content is cooled to ambient temperature.

490 g of polypropylene are discharged from the autoclave, said polypropylene having a fraction insoluble in xylene at 25° C. (X.I.)=96.2% by wt and a melt flow index MFR/L=5.0 g/10 min.

The polymerization yield is 102 Kg of polypropylene/g of solid catalyst component.

Comparative Example 108 liters of $TiCl_4$ are introduced at 0° C. in a 120 liters stainless steel reactor equipped with a stirring device and baffles. Under stirring 5.4 Kg of a support of formula $MgCl_2.2.8C_2H_5OH$, are introduced.

At the end of the feeding, the temperature is brought to 40° C. and 4.07 moles of 9,9-bis(methoxymethyl)fluorene are introduced as an electron donor compound.

The temperature of the reaction mixture is then increased to 100° C. and a mild stirring is maintained for a time of 50 minutes.

The obtained slurry is then subjected to a sedimentation step for 30 minutes in order to separate the solid from the liquid phase. Afterwards 86 liters of $TiCl_4$ are siphoned in a time of 30 minutes.

The separated solid is then subjected to a successive step of titanation by adding 86 liters of $TiCl_4$: after 30 minutes under a mild stirring at 100° C. the slurry is again subjected to a sedimentation step for 30 minutes in order to separate the solid from the liquid phase. Afterwards 86 liters of $TiCl_4$ are siphoned in a time of 30 minutes. Finally the separated solid is washed at 80° C. with hexane and filtered until all chlorine ions disappear from the filtrate. The solid is then dried so obtaining 4.0 Kg of catalyst component.

Taking account that the total time of the liquid/solid separation step is 60 minutes, in this case the ratio between the solid/liquid separation velocity and the final amount of separated solid of 86/(60×4.0)=0.36 liter/(min·Kg).

The obtained catalyst component contains:

Ti=4.8% by wt;

9,9-bis(methoxymethyl)fluorene=13.7% by wt

Polymerization Test

The polymerization is carried out in a 4 liter autoclave, previously purged with gaseous propylene at 70° C. for 1 hour.

70 ml of anhydrous n-hexane containing 7 mmol of triethylaluminum and 4 mg of the above prepared solid catalyst component are introduced in a propylene current at room temperature.

1.7 Nl of H2 and 1.2 Kg of liquid propylene are then introduced in the autoclave: the stirring device is actuated and the temperature is increased to 70° C. for a time of 5 minutes. After 2 hours at 70° C., the agitation is interrupted, the non-polymerized monomer is removed and the reactor content is cooled to ambient temperature.

350 g of polypropylene are discharged from the autoclave, said polypropylene having a fraction insoluble in xylene at 25° C. (X.I.)=95.6% by wt and a melt flow index MFR/L=2.0 g/10 min.

The polymerization yield is 88 Kg of polypropylene/g of solid catalyst component. The values of Ti %, Di % in the solid catalyst component are reported in Table 1. The amounts of the solid catalyst component and external donor, as well as the results in term of X.I. % and polymerization yield are reported in Table 2.

TABLE 1

|  | Ti (% by wt) | Diether (% by wt) |
| --- | --- | --- |
| Example 1 | 4.1 | 16.9 |
| Example 2 | 4.8 | 12.9 |
| Example 3 | 4.8 | 12.9 |
| Example 4 | 4.5 | 16.5 |
| Comp. Example | 4.8 | 13.7 |

TABLE 2

|  | Catalyst comp. (mg) | External donor (mmol) | X.I. (%) | Polymerization yield (Kg/g cat.) |
| --- | --- | --- | --- | --- |
| Ex. 1 | 4.0 | — | 96.0 | 113 |
| Ex. 2 | 3.5 | — | 95.0 | 130 |
| Ex. 3 | 4.3 | 0.35 | 99.0 | 105 |
| Ex. 4 | 4.8 | — | 96.2 | 102 |
| Comp. | 4.0 | — | 95.6 | 88 |

The invention claimed is:

1. A process for preparing a diether-based catalyst component comprising the steps of:
   a) contacting a solid support comprising a magnesium halide or a precursor thereof, one or more 1,3-diethers and a liquid phase containing a titanium compound, thereby forming a slurry;
   b) separating the slurry in a solid/liquid separation step, thereby isolating a diether-based solid catalyst component, wherein the solid/liquid separation step has a solid/liquid separation velocity;
   wherein a ratio between the solid/liquid separation velocity and the final amount of the separated solid catalyst component is higher than 0.5 liter/(min·Kg).

2. The process according to claim 1, wherein the ratio between the solid/liquid separation velocity and the final amount of the separated solid catalyst component is in the range from 0.7 to 2 liter/(min·Kg).

3. The process according to claim 1, wherein the separation step b) is carried out by filtration.

4. The process according to claim 3, wherein the filtration is carried out by using filters which are vessels containing one or more filtering units having openings between 1 to 200 µm and wherein a differential pressure applied on the filter ranges from 50 to 1000 Kpa.

5. The process according to claim 4, wherein the filters are selected from Nutsche filters and centrifugal-discharge filters.

6. The process according to claim 1, wherein step a) takes place in a reactor situated upstream of a filter.

7. The process according to claim 1, wherein both step a) and step b) take place in a filter.

8. The process according to claim 1, wherein in step a), an initial temperature of the liquid phase containing the Ti compound is in the range from −20° C. to 25° C. and then gradually raised to a second temperature range from 80° C. to 135° C.

9. The process according to claim 1, wherein the molar ratio of Mg to 1,3-diether is between 0.5 and 50.

10. The process according to claim 1, wherein steps a) and step b) are repeated more times in sequence and finally the separated solid component is washed with a solvent selected from a hydrocarbon or a halogenated hydrocarbon.

11. The process according to claim 1, wherein the titanium compound to be fed in step a) is selected from $TiCl_4$, $TiCl_3$ and Ti-haloalcoholates of formula $Ti(OR)_{n-y}X_y$, where n is the valence of titanium, y is a number between 1 and n−1, X is halogen and R is a hydrocarbon radical having from 1 to 10 carbon atoms.

12. The process according to claim 11, wherein the titanium compound is $TiCl_4$.

13. The process according to claim 1, wherein the solid support to be fed in step a) is a magnesium halide or a Mg compound that yields $MgCl_2$ by reaction with a chlorinating agent.

14. The process according to claim 13, wherein the solid support is a spheriform adduct of formula $MgCl_2 \cdot pROH$, where p is a number between 0.1 and 6 and R is a hydrocarbon radical having 1–18 carbon atoms.

15. The process according to claim 14, wherein the solid support is a $MgCl_2$/ethanol adduct.

16. The process according to claim 1, wherein the 1,3-diethers to be fed in step a) have formula (I):

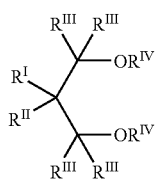

(I)

where $R^I$ and $R^{II}$ are hydrogen or linear or branched $C_1$–$C_{18}$ hydrocarbon groups which can also form one or more cyclic structures, with the proviso that $R^I$ and $R^{II}$ cannot be contemporaneously hydrogen; $R^{III}$ groups, equal or different from each other, are hydrogen or $C_1$–$C_{18}$ hydrocarbon groups; $R^{IV}$ groups, equal or different from each other, are $C_1$–$C_{18}$ hydrocarbon groups; and each of $R^I$ to $R^{IV}$ groups can contain heteroatoms selected from halogens, N, O, S and Si.

17. The process according to claim 16, wherein the 1,3 diethers are compounds of formula:

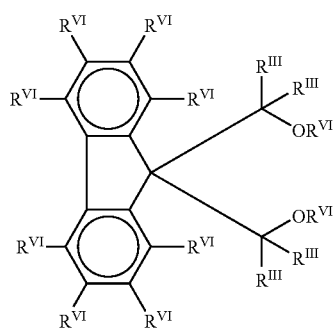

(II)

where the $R^{VI}$ radicals, equal or different, are hydrogen, halogens, linear or branched $C_1$–$C_{20}$ alkyl radicals, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more heteroatoms selected from the group consisting of N, O, S, P, Si and halogens as substitutes for carbon or hydrogen atoms, or both.

18. The process according to claim 17, wherein the 1,3 diethers are selected from:

9,9-bis(methoxymethyl)fluorene, 9,9-bis(methoxymethyl)-2,3,6,7-tetramethyifluorene, 9,9-bis(methoxymethyl)-2,3,4,5,6,7-hexafluorofluorene, 9,9-bis(methoxymethyl)-2,3 -beuzofluorene, 9,9-bis(methoxymethyl)-2,3,6,7-dibenzofluorene, 9,9-bis(methoxymethyl)-2,7-diisopropylfluorene, 9,9-bis(methoxymethyl)-1,8-dichlorofluorene, 9,9-bis(methoxymethyl)-2,7-dicyclopentylfluorene, 9,9-bis(methoxymethyl)-1,8-difluorofluorene, 9,9-bis(methoxymethyl)-1,2,3,4-tetrahydrofluorene, 9,9-bis(methoxymethyl)-1,2,3,4,5,6,7,8-octahydrofluorene, and 9,9-bis(methoxymethyl)-4-tert-butylfluorene.

19. A process for the homo- or co-polymerization of α-olefins of formula $CH_2$=CHR, wherein R is hydrogen or an alkyl, cycloalkyl, aryl, arylalkyl or alkylaryl radical with 1 to 12 carbon atoms, said process comprising a polymerization step carried out in the presence of catalyst systems comprising the solid catalyst component obtained by steps comprising:
   a) contacting a solid support comprising a magnesium halide or a precursor thereof, one or more 1,3-diethers and a liquid phase containing a titanium compound, thereby forming a slurry;
   b) separating the slurry in a solid/liquid separation step, thereby isolating a diether-based solid catalyst component, wherein the solid/liquid separation step has a solid/liquid separation velocity;
   wherein a ratio between the solid/liquid separation velocity and the final amount of the separated solid catalyst component is higher than 0.5 liter/(min·Kg).

20. The process according to claim 17 wherein the halogens are selected from the group consisting of Cl and F.

* * * * *